US011157443B2

(12) United States Patent
Hurst et al.

(10) Patent No.: US 11,157,443 B2
(45) Date of Patent: Oct. 26, 2021

(54) MANAGEMENT OF HISTORY METADATA OF A FILE

(71) Applicant: International Business Machines Corporation, Armonk, NY (US)

(72) Inventors: Stephen Hurst, Four Marks (GB); Daniel Jeffrey, Southampton (GB); Ian Mark Hodges, Horton Heath (GB)

(73) Assignee: International Business Machines Corporation, Armonk, NY (US)

(*) Notice: Subject to any disclaimer, the term of this patent is extended or adjusted under 35 U.S.C. 154(b) by 204 days.

(21) Appl. No.: 16/405,055

(22) Filed: May 7, 2019

(65) Prior Publication Data

US 2020/0356526 A1 Nov. 12, 2020

(51) Int. Cl.
| | |
|---|---|
| *G06F 16/11* | (2019.01) |
| *G06F 16/18* | (2019.01) |
| *G06F 16/16* | (2019.01) |
| *G06F 16/172* | (2019.01) |
| *G06F 16/174* | (2019.01) |

(52) U.S. Cl.
CPC .......... *G06F 16/128* (2019.01); *G06F 16/162* (2019.01); *G06F 16/164* (2019.01); *G06F 16/172* (2019.01); *G06F 16/1756* (2019.01); *G06F 16/1873* (2019.01)

(58) Field of Classification Search
CPC .... G06F 16/128; G06F 16/162; G06F 16/164; G06F 16/1756; G06F 16/1873; G06F 16/172
USPC ........................................................ 707/639
See application file for complete search history.

(56) References Cited

U.S. PATENT DOCUMENTS

| 9,430,546 B2 | 8/2016 | Poirier et al. | |
|---|---|---|---|
| 9,563,640 B2 | 2/2017 | Sudhakar et al. | |
| 10,055,302 B2 | 8/2018 | Letkeman | |
| 2008/0077848 A1* | 3/2008 | Roberts | G06F 40/197 |
| | | | 715/229 |
| 2008/0195677 A1* | 8/2008 | Sudhakar | G06F 16/128 |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

(Continued)

*Primary Examiner* — Evan Aspinwall
(74) *Attorney, Agent, or Firm* — Rachel Yadlosky (57) ABSTRACT

A computer-implemented method, system, and computer program product for managing history metadata of a file. The method may include accessing a first file with delta information. The method may also include determining a portion of the first file to be moved. The method may also include reviewing the delta information of the first file for changes to the portion in the delta information. The method may also include, in response to reviewing the delta information, generating a portion delta history for the portion. The method may also include inserting the portion in a position in a second file, where the portion is inserted with the portion delta history. The method may also include generating new delta information for the second file, where the new delta information includes the portion delta history of the inserted portion.

20 Claims, 7 Drawing Sheets

(56) References Cited

U.S. PATENT DOCUMENTS

2018/0113862 A1  4/2018  Glover

OTHER PUBLICATIONS

Oracle, "{OpenGrok," GitHub Pages, Printed May 2, 2019, 2 pages, http://oracle.github.io/opengrok/.

"Join GitHub Today," GitHub—crange/crange: Crange is a tool to index and cross-reference C/C++ source code, Printed May 2, 2019, 4 pages, https://github.com/crange/crange.

Elbon, "Cutting, Copying and Pasting," Help / AppCode, Last modified Apr. 18, 2019, Printed on May 2, 2019, 5 pages, https://www.jetbrains.com/help/objc/cutting-copying-and-pasting.html.

"Ctags," Wikipedia, Last edited on Jan. 27, 2019, Printed on May 2, 2019, 5 pages, https://en.wikipedia.org/wiki/Ctags.

Historical Manuals, University of Kentucky Computing Center, XEDIT Reference, VM / SP Release 3, Fifth Edition, Revision 0, Mar. 1984, 44 pages, http://ukcc.uky.edu/ukccinfo/391/xeditref.html.

\* cited by examiner

MANAGEMENT OF HISTORY METADATA OF A FILE

BACKGROUND

The present invention relates to management of history metadata of a computer-based file, and more specifically, to management of histories of portions of a file that are moved.

In Source Control Management (SCM) systems, history is kept of all changes to a file. These histories, or deltas, are used to build a complete version of a file at any particular point in its history. Delta compression may be used to retain the differences between successive versions of files. Each delta may record the lines inserted, changed, or deleted, who made the change, and the reason why the lines were changed (i.e., an auditable change reason). Delta compression may be used in code archaeology to determine details of previous file changes.

SUMMARY

The present invention provides a computer-implemented method, system, and computer program product for managing history metadata of a file. The method may include accessing a first file with delta information. The method may also include determining a portion of the first file to be moved. The method may also include reviewing the delta information of the first file for changes to the portion in the delta information. The method may also include, in response to reviewing the delta information, generating a portion delta history for the portion. The method may also include inserting the portion in a position in a second file, where the portion is inserted with the portion delta history. The method may also include generating new delta information for the second file, where the new delta information includes the portion delta history of the inserted portion.

The system may have one or more computer processors and may be configured to access a first file with delta information. The system may also be configured to determine a portion of the first file to be moved. The system may also be configured to review the delta information of the first file for changes to the portion in the delta information. The system may also be configured to, in response to reviewing the delta information, generate a portion delta history for the portion. The system may also be configured to insert the portion in a position in a second file, where the portion is inserted with the portion delta history. The system may also be configured to generate new delta information for the second file, where the new delta information includes the portion delta history of the inserted portion.

The computer program product may include a computer readable storage medium having program instructions embodied therewith, the program instructions executable by a server to cause the server to perform a method. The method may include accessing a first file with delta information. The method may also include determining a portion of the first file to be moved. The method may also include reviewing the delta information of the first file for changes to the portion in the delta information. The method may also include, in response to reviewing the delta information, generating a portion delta history for the portion. The method may also include inserting the portion in a position in a second file, where the portion is inserted with the portion delta history. The method may also include generating new delta information for the second file, where the new delta information includes the portion delta history of the inserted portion.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention relates to management of history metadata of a computer-based file, and more specifically, to management of histories of portions of a file that are moved. While the present disclosure is not necessarily limited to such applications, various aspects of the disclosure may be appreciated through a discussion of various examples using this context.

Although delta compression may be used to retain the differences between successive versions of files, discussed herein, if a portion of the file is rearranged (e.g., a block of code is copied or moved from one part of the file to another, or to a new file) then the history within that portion is lost. The rearranged portion is seen as a new section of data, and the old portion, or data, appears as deleted. According to the source control history, the rearranged file portion appears as new content at its new location, and any history of the file portion/data (e.g., previous changes that were made to the file portion) when the file portion was in its previous location are now unknown.

The present disclosure provides a computer-implemented method, system, and computer program product for managing history metadata of a file when moving a portion of a file within the same file or between multiple files. In some embodiments, the moving may include copying the portion of the file, while also keeping the portion in the original location, and inserting the copied portion (or copied logical unit) in a new location. In some embodiments, moving a portion of the file may include cutting the portion of the file by removing it from its original location and inserting it in a new location.

A file editor (also known as a text or code editor) may be used in conjunction with a source control management (SCM) system to provide additional history of delta information for a portion of a file that is being moved. The term file editor is used herein, and may be any program that enables editing of a file. This program may be provided as an extension to the SCM system or as a separate editing system.

The file editor may help the SCM system determine historical details of what has happened when portions of a file are moved either within the same file or to another file. A portion of a file may be a logical unit that is defined as something which makes sense to move around on its own, usually in the root of the file. For example, in Java™, the logical unit may be the programming language terms corresponding to an entire method or a variable.

The file editor constructs delta information for changes to a file and presents these to the SCM system for storage and access by other users. A SCM system stores an original version of the file with one or more deltas showing chronological changes to the original version such that the delta information can be used to build a new version of the file while referencing changes to the file with information as to who made the changes and why.

The file editor in the described system is able to reference previous delta information for the file (or for another file) when a portion of a file is moved within the same file (or to another file). The file editor references portion delta history of a moved portion of a file in the source control management system so that the portion delta history is available at the new location. Delta history of a moved portion, described further below, references existing areas of delta information for the file from which the portion is moved to provide information as to the historical changes to the moved portion. This may also be referred to as a sub-delta of the file.

Figure 1:
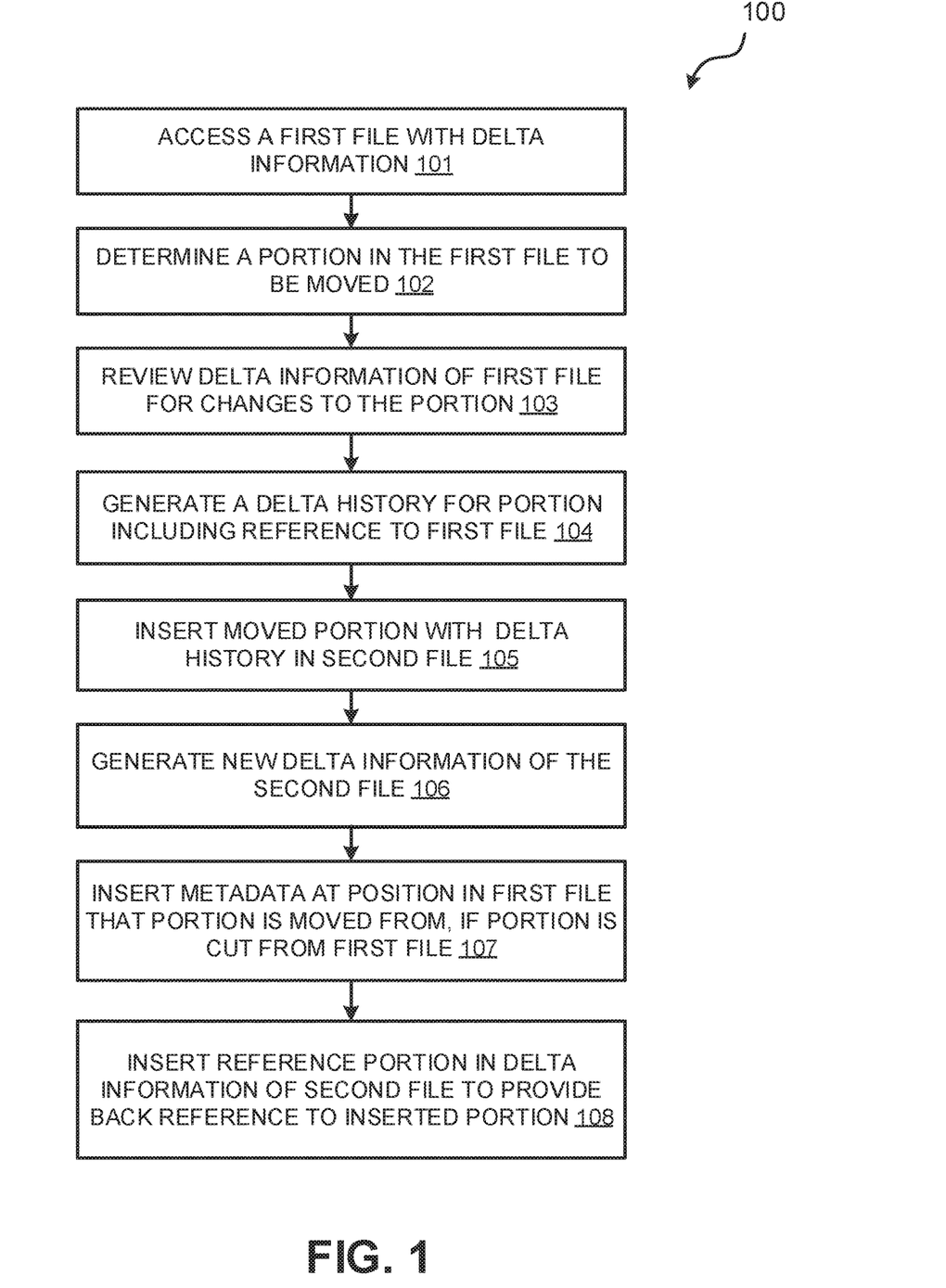
FIG. 1 depicts a flow diagram of an example embodiment of a method for maintaining history metadata of a file, according to some embodiments.

Referring now to FIG. 1, a flow diagram shows an example embodiment of the described method 100 as carried out by a file editor with reference to a SCM system. The method 100 accesses a first file with delta information, at operation 101. In some embodiments, accessing the first file from the source control management system includes building, or constructing, the delta information of the first file to form the first file. The delta information may include chronological delta information starting from the original version of the first file. The first file may be built, or constructed, by identifying a first delta, that contains the complete original first file as initially stored in the SCM system, and then applying each delta that has been produced on top of the previous delta until a current version of the first file is built and ready to be edited. The delta information (i.e., delta metadata) may be supplied to the file editor from the SCM system. The delta information may show which lines were inserted, changed, or deleted with reference to a previous delta. The delta may also reference an identification of the user who changed the file and a reason for the change, along with any associated comments when the delta was stored in the SCM system.

The method 100 selects a portion of a first file to be moved, at operation 102. In some embodiments, the portion may be selected by a user of the file editor, for example, by right clicking an input device to select a portion of text. Selecting the portion may copy the contents of the portion without cutting it, or may cut the contents of the portion ready to be inserted in a new position in a second file. In some embodiments, the first file and the second file are the same file, wherein the selected portion is moved within the same file. In some embodiments, the first file and the second file are different files, wherein the selected portion is moved from a first file to a second file. The terms first and second file are used to explain the method clearly.

The method 100 reviews delta information of the first file for changes to the portion in the delta information, at operation 103. In some embodiments, the review starts from most recent deltas (i.e., the most recent changes to the file) and goes back to the original version of the file. Each delta from the delta information may indicate a change to the first file. The method 100 generates a delta history for the portion (portion delta history), at operation 104. The delta history may include a reference to the first file. In some embodiments, the delta history for the portion is generated using the review of the delta information. The portion delta history includes references to areas of previous delta information of the first file that are relevant to the portion, and references the previous changes made. The portion delta history may include a reference to identify the first file, particularly if this file is different than the second file. The portion delta history may be formed of sub-deltas that use delta identifiers and line numbers within the identified delta to show the history of the changes to the portion.

The method 100 inserts the selected portion of the first file in a position in a second file, at operation 105. The selected portion is inserted with the portion delta history. By including and inserting the portion delta history with the portion of the first file, the delta(s) of the selected portion (i.e., the portion delta history along with any new deltas that are created at the new position) in the position in the second file can be referenced directly. Therefore, the newly inserted selected portion is not seen as a new portion without history, but as a portion that has a history (i.e., the portion delta history) that is accessible and able to be referenced.

The method 100 may generate new delta information for the second file, at operation 106. The new delta information may include the metadata of the portion delta history of the inserted portion. In some embodiments, the new delta information is generated for storing in the SCM system. In the case of the first and second file being the same file and the selected portion being moved within the same file, this new delta information is for the same file.

If selecting the portion includes cutting the contents of the portion of the first file from the first file, the method 100 may insert metadata at the position of the cut contents in the first file to indicate where the portion is inserted in the second file, at operation 107. This way, the new location of the cut contents is known and is identifiable from the first file.

In some embodiments, the method 100, particularly if the first and second files are different, inserts a reference portion in the delta information of the second file to provide a reference to the inserted portion, at operation 108. The inserting the reference portion may be an optional display method provided after the described processing in order to present the data at a later date.

Figure 2:
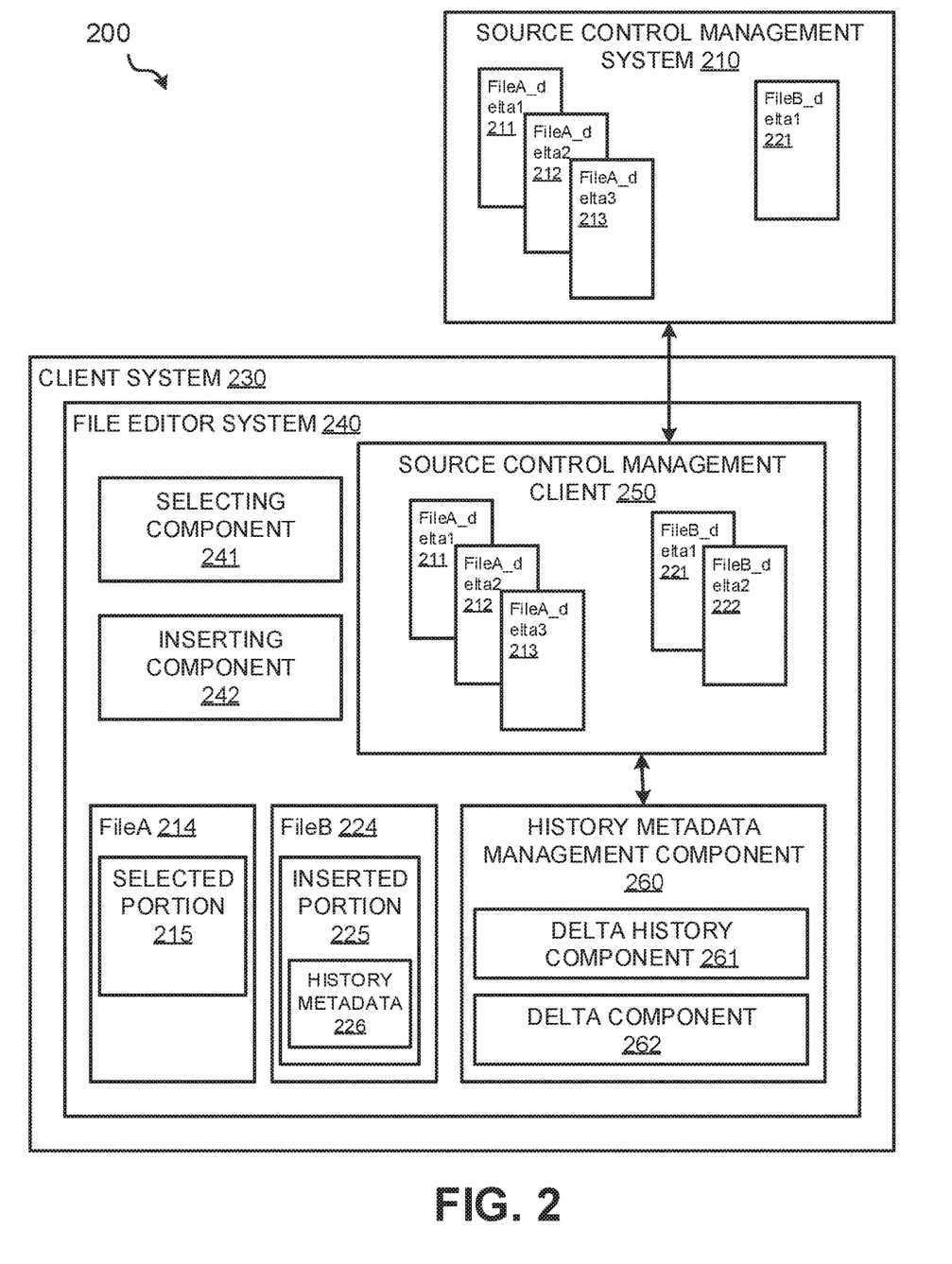
FIG. 2 depicts a block diagram of an example system for maintaining history metadata of a file, according to some embodiments.

Referring to FIG. 2, a schematic diagram shows an example embodiment of an overall system 200 in which the described method may be implemented. The system 200 includes a source control management (SCM) system 210 that may be a service provided to one or more client systems 230, with an example of such a client system 230 is shown.

A client system 230 has a file editor system 240 for editing files. A file editor system 240 may be for editing source code or other forms of text and may be a standalone application or part of an integrated development environment or web browser. The file editor 240 may typically have a SCM client 250, or plugin of the SCM system 210, which contributes files to the file editor 240 to handle SCM operations. For example, Rational Team Concert™ (RTC) is a SCM system which provides to an Eclipse™ client.

The SCM system 210 stores an original version of a file, such as FileA_delta1 211 or FileB_delta1 221. When changes are made to a file, a new delta is generated, such as FileA_delta2 212 and FileA_delta3 213. A delta may also reference the author of the change and an auditable reason for the change. Over time, a file will have multiple deltas and the deltas are used to construct the current file, and show changes during the life of the file. For example, FileA_delta1 211, FileA_delta2 212, and FileA_delta3 213 are all deltas of FileA 214. The current file of FileA 214 may be constructed using all three deltas—FileA_delta1 211, FileA_delta2 212, and FileA_delta3 213.

The SCM client 250 retrieves from the SCM system 210 all deltas associated with a file, such as FileA_delta1 211, FileA_delta2 212 and FileA_delta3 212, so that the file, FileA 214, may be built and the history of the file may be browsed by the end user in the file editor system 240. When a user wishes to change a file, the SCM system 210 furnishes a file (e.g., FileA 214 and/or FileB 224) that is built from the complete initial file with each of the delta elements applied to build up the resultant file to edit.

The user may edit some code in a file and "checks in" to the SCM client 250. A conventional operation for the SCM client 250 in known systems is to determine what has changed inside the file, by doing a basic line for line comparison, and to construct a new delta from those observed changes for storage at the SCM system 210.

There are many embodiments of SCM systems 210 and a very simple embodiment is described as an illustration for use in the following description. For the purpose of discussion, in a simple SCM embodiment when a file is changed a delta of the file is created. This delta shows the lines that are inserted, changed, or deleted since the previous version.

An example extract of code of a source file may be:

```
1    package patent.demo
2
3    public class Demo {
4
5        private static int count = 0
6        private static String MESSAGE = "Count is ";
7
8        private static void addToCount(int i) {
9            count = count + i ;
10       }
11
12
13       public static void main(String[ ] args) {
14           addToCount(Integer.parseInt(args[0]));
15           System.out.println(MESSAGE + count);
17       }
17   }
```

An example extract of the updated code may be:

```
1    package patent.demo
2
3    public class Demo {
4
5        private static int count = 0
6        private static String MESSAGE = "Count is ";
7
8        private static void addToCount(int i) {
9            count += i;
10       }
11
12
13       public static void main(String[ ] args) {
14           addToCount(Integer.parseInt(args[0]));
15           System.out.println(MESSAGE = count);
16       }
17
18       private static void substractFromCount(int i) {
19           count -=i;
20       }
```

The delta describing the changes is stored in the SCM system 210, and may be:

```
1    C:9
2    :    count += i;
3    D:12
4    I: 17-20
5    :    private static void substractFromCount(int i) {
6    :        count -= i;
7    :    }
8    :
```

This indicates:

a change (C) in line 9 of "count += I",
a deletion (D) of line 12, and
an insertion (I) of lines 17-20 of
"private static void substractFromCount(int i) {
    count -= i;
}"

In the described system, the file editor system 240 includes a history metadata management component 260 providing the described functionality to manage independent histories of different sections or portions of a whole file. The history metadata management component 260 manages history metadata elements of a file that can be moved between files or within another file maintaining the history for future interrogation.

The file editor system 240 may build FileA 214 by obtaining the original FileA_delta1 211 from the SCM system 210 via the SCM client 250 as well as all deltas, FileA_delta2 212 and FileA_delta3 213, providing changes to the original file to result in the current version of the file. The constructed FileA 214 may be displayed to the user via a user interface of the file editor system 240.

A selecting component 241 of the file editor system 240 may be used to select a portion 215 of FileA 214 that the user wishes to move to FileB 224 as an inserted portion 225 (e.g., via copy and paste or cutting).

The history metadata management component 260 includes a delta history component 261, which uses the SCM client 250 to review the deltas 211, 212, 213 of FileA 214 from which the portion 215 is being copied to generate a portion delta history.

The delta history component 261 reviews the deltas, 211, 212, 213 starting with the most recent, and by comparing each delta with the following delta determines the changes that were made to the portion of the file in question. Comparing two deltas may be achieved by current editors, so this functionality may be used. Any sections of a delta that directly affect the portion 215 in question are added to a list for carrying forward. This continues until the original file 211 is reached. The line numbers in the delta should give a complete match.

For example, if line 16 of FileA 214 has been selected to be moved, and the previous delta for FileA 214 had a change for line 16, then that change is brought forward. If that previous delta also inserted line 11, it is known that the line 16 will have been line 15 in the deltas before the previous delta (due to the line 11 insertion). So, if there is a change to line 15, then that change is brought forward too, and so on. The portion delta history is added as history metadata 226 with the inserted portion 225 in FileB 224. The inserted portion 225 corresponds with the selected portion 215. For example, the selected portion 215 may be copied, and the inserted portion 225 may be the pasted portion of the copied selected portion 215.

The history metadata management component 260 also includes a delta component 262 for providing a delta of the changed files, FileA 214 from which the portion is deleted and FileB 215 in which the portion is inserted 225. The new delta for FileB 224, FileB_delta2 222, includes the history metadata 226 referencing the history of the changes to the inserted portion 225 with reference to the FileA deltas 211, 212, 213.

Figure 3:
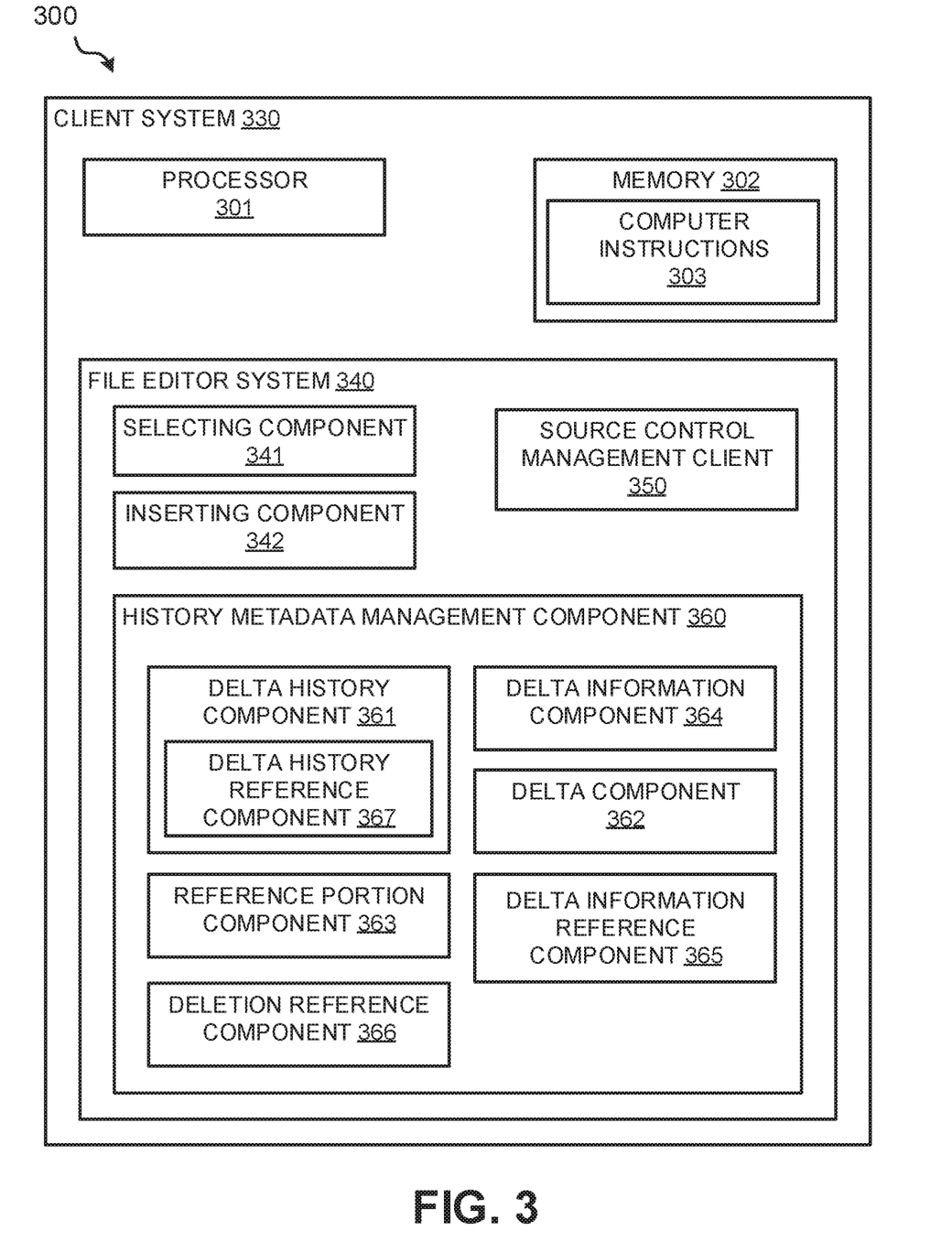
FIG. 3 depicts a block diagram of an example client system, according to some embodiments.

Referring to FIG. 3, a block diagram 300 shows further components of the history metadata management component 360 of the file editor system 340 at a client system 330. The history metadata management component 360 may correspond to history metadata management component 260 (FIG. 2), the file editor system 340 may correspond to file editor system 240 (FIG. 2), and the client system 330 may correspond to client system 230 (FIG. 2). The client system 330 includes at least one processor 301, a hardware module, or a circuit for executing the functions of the described components which may be software units executing on the at least one processor. Multiple processors running parallel processing threads may be provided, enabling parallel processing of some or all of the functions of the components. Memory 302 may be configured to provide computer instructions 303 to the at least one processor 301 to carry out the functionality of the components.

The file editor system 340 includes a SCM client 350 (as explained with reference to FIG. 2 and SCM client 250), and file editor functionality including a selecting component 341 and an inserting component 342 (again explained with reference to FIG. 2 and selecting component 241 and inserting component 242). SCM client 350 may correspond to SCM client 250 (FIG. 2), and selecting component 341 and inserting component 342 may correspond to selecting component 241 and inserting component 242 respectively (FIG. 2).

The history metadata management component 360 includes a delta information component 364 for accessing a file from the SCM system by the SCM client 350, including building the delta information of the file from the original file using the delta information. The history metadata management component 360 includes a delta component 362 for constructing delta information for a file and presenting the delta information to the SCM system for storage via the SCM client 350. Delta component 362 may correspond to delta component 262 (FIG. 2).

The history metadata management component 360 includes a delta history component 361 for generating a delta history for a portion being moved within a file or between files. Delta history component 361 may correspond to delta history component 261 (FIG. 2). The delta history component 361 includes a delta history reference component 367 for referencing areas of previous delta information of a file from which the portion is being moved that are relevant to the portion.

The history metadata management component 360 may also include a reference portion component 363 for adding a reference portion in an original file of the file in which the portion is inserted in order to show that this portion has been inserted later.

The history metadata management component 360 may also include a deletion reference component 366 that adds metadata at the position of cut contents in a file to indicate where the portion is inserted in the same or another file.

The history metadata management component 360 may also include a delta information reference component 365 for allowing the file editor system to reference previous delta information for the file or another file's delta information when a portion of a file is moved either within the same file or to another file.

The described method and system managing different histories for different sections of the same file, allowing the history to be referenced within a file or from another file along with the text section so that the change history is available for the copied/moved text or code block.

When moving portions of text or code within a file or from one file to another, the editor is involved to help the SCM system determine what has happened by providing more information. The functionality may be built into the file editor system and may be activated by a selection by the user in relation to a portion of a file, for example, by using a designated action or by using editor copy (or cut) and paste actions with additional functionality. This tells the file editor system that the user wants to move the unit from the current file (by copying or cutting it) and put it into the same file in another position or another file, while also carrying forward the deltas which would previously have been lost.

Conventionally, a file editor is presented with a complete file as built by a SCM system ready to edit, and at some point the complete file is passed to the SCM system for storage. The SCM system may then create a delta to represent the changes from the last file version in the SCM system and the newly edited file.

With the described system, it is the file editor system that is responsible for constructing the delta change to the file that is then presented to the SCM system for storage. This change allows the file editor system to reference previous delta information for the file, or another file's, delta information when a portion of a file is moved either within the same file or another file.

By doing this, the SCM system, file editor system, and code visualizers can reference a file's deltas directly and know when lines are pasted (from another file location or another file) where they came from, their change history, why they changed and who changed them. The advantage is that from a code archaeology or code comparison point of view, the newly inserted lines are not seen as new lines without history, but newly inserted lines that had a life in another file or the same file, but at a different location. The delta that is created references previous deltas along with information that covers what parts of the delta references are relevant. This referenced delta information and its reuse is referred to as a portion delta history.

The file editor may create an SCM delta directly rather than having the SCM system create the delta by comparing before and after files. Code comparison viewers will have more awareness via the referenced deltas to show more detailed differences and not just code inserted or deleted.

Figure 4:
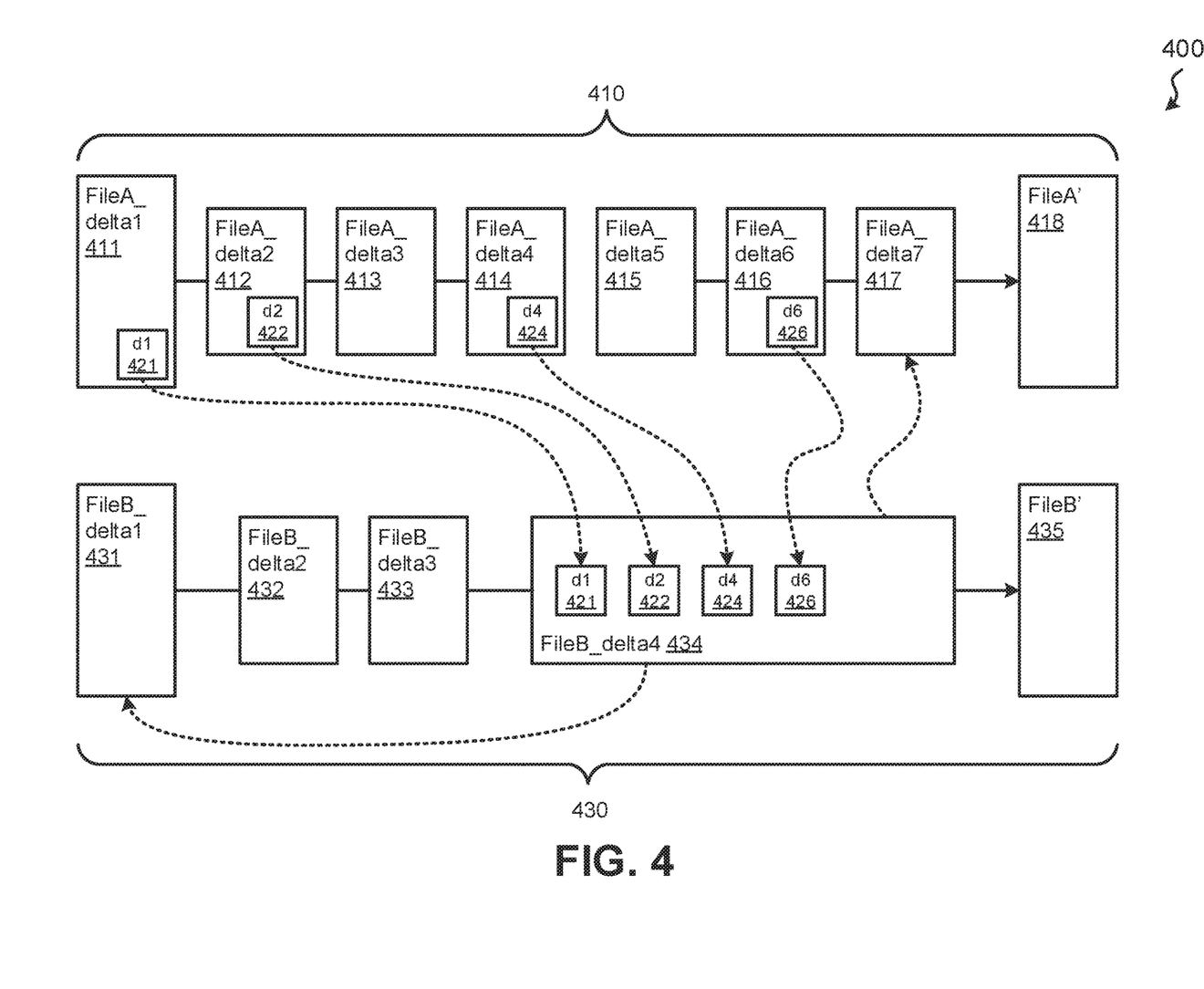
FIG. 4 depicts a schematic diagram of delta histories, according to some embodiments.

Referring to FIG. 4, an example process 400 of file construction, or building, is illustrated. Please note there are many more complex embodiments that have many advantages. The described process is equally applicable to those embodiments, but the implementation detail may vary.

In some embodiments, the delta metadata is supplied to the file editor from the SCM system, which builds up a complete file and presents it to the user for editing. When the user requests to save the file the file editor saves a new calculated delta. This delta is updated by the editor until it is stored in the SCM system as a new file version. The delta shows what lines were inserted, changed or deleted with reference to the previous delta. The delta also references an identifier of the person who changed the file and the auditable reason for the change, e.g. a GitHub Issue, and any associated comments when the delta is stored in the SCM system.

Each file managed by the SCM system is built by a number of deltas. When lines of text are copied or moved either within the same file or between files a portion delta history element in the current file delta is created as described above. A portion delta history consists of one or more references to deltas, the file owner of the deltas, which could be the same file being edited, and the parts (lines) of that delta that are relevant to this new portion delta history.

File A 410 is constructed by taking the first delta, FileA_delta1 411 (that contains the complete file as initially stored in the SCM) and then each delta that is produced, starting with File A_delta2 412, is applied on top of the previous delta, here FileA_delta1 411, to produce a changed complete file. Then the next delta that is produced, FileA_delta3 413, is applied on top of the previous delta, FileA_delta2 412, to produce a new changed complete file, then the next delta, FileA_delta4 414, is applied, and so on until the final version of the file, File A' 418 is produced and is ready to be edited.

File A 410 was created and then modified five times, so it consists of:

FileA_delta1 (the complete initial file) 411;
FileA_delta2 (Change 1) 412;
FileA_delta3 (Change 2) 413;
FileA_delta4 (Change 3) 414;
FileA_delta5 (Change 4) 415;
FileA_delta6 (Change 5) 416.

The complete initial file, FileA_delta1 411, may itself contain deltas and sub-deltas if the file was cloned from an existing file with its own history.

File B 430 was created and was then modified twice, so it consists of:

FileB_delta1 (the complete initial file) 431;
FileB_delta2 (Change 1) 432;
FileB_delta3 (Change 2) 433.

A final version of the file, File B' 435 may be produced from the File B deltas 431-433.

File B 430 is being edited and hence its new delta, FileB_delta4 434 is being constructed. Lines 200-250 are cut and moved from File A' 418 and are inserted in to File B' 435 at line 1020.

In conventional SCM systems, this would be represented as a delete in FileA_delta7 417 and an insert in FileB_delta4 434 and the history of the changes to the method would be lost.

Using the present invention, File A 410 lines 200-250 are constructed from delta 1 1411, delta 2 412, delta 4 414 and delta 6 416. The subsets of the deltas d1 421 (from delta 1 1411), d2 422 (from delta 2 412), d4 424 (from delta 4 414), d6 426 (from delta 6 416), including the original file, are copied into FileB_delta4 434. Additional information in the delta says where it is to be inserted. In the new File B delta, FileB_delta4 434, an insert point at Line 1020 is created. This insert point of the new delta 434 references the four File A deltas and notes that each of those changes is limited to the copied lines, i.e. 200-250.

File A has a new delta, FileA_delta7 417, which deletes the lines. This delta, FileA_delta7 417, would also show where the lines are moved to by referencing FileB_delta4 434.

When the new delta of File B, FileB_delta4 434, is saved by the editor, the history of change of the newly inserted lines at line 1020 is available so that the SCM system, editor or other file visualizers can show that the full history of the lines between 1020 and 1069 because these tools can use the delta history of the delta to locate the original deltas and surface date of the delta, the original file name if different, the author of the deltas and the auditable reason of why each delta was created.

By utilizing, and looking at, deltas, the SCM system could "tie together" (using metadata in the deltas) certain changes. For example, when viewing the changes between FileB_delta1 431 (original file) and FileB_delta2 432, it could show a "greyed out" method (because it was not actually in the file) in File B with the corresponding changes that were actually made in FileA_delta7 417 (where the method would no longer be visible).

Unique IDs may be used to reference other deltas. These could be part of the 'header' of a delta. This has the advantage that if a potential bug is being investigated in the last delta and it has delta history information, that new text can be viewed to see who changed what and for what reason over its life. This information is very valuable in these situations.

The editor may also display moved text when requested in a greyed-out way to show that code was once here.

Example

File A—named ClientConstants.java:

```
package patent.demo;
public class ClientConstants {
    public static String FILE_EXTENSION = ".xml";
    public static int CONNECTION_TIMEOUT = 20;
}
```

The delta for File A may be:

```
File name: ClientConstants.java
Delta comment: Initial check in of a new client
Delta ID: A00001
I:1-8
: package patent.demo;
:
: public class ClientConstants {
: public static String FILE_EXTENSION = ".xml";
: public static int CONNECTION_TIMEOUT = 20;
:
: }
```

File B—named ServerConstants.java:

```
package patent.demo;
public class ServerConstants {
    public static String LOG_EXTENSION = ".log";
```

-continued

```
    public static int MAX_RETRIES = 3;
    public static int RETRY_WAIT = 10;
}
```

The delta for File B may be:

```
File name: ServerConstants.java
Delta comment: Initial check in of a new client
Delta ID: A00001
I:1-9
: package patent.demo;
:
: public class ServerConstants {
:
: public static String LOG_EXTENSION = ".log";
: public static int MAX_RETRIES = 3;
: public static int RETRY_WAIT = 10;
:
: }
```

Now, both files are changed. FileA is changed:

```
package patent.demo;
public class ClientConstants {
    public static String FILE_PREFIX = "SH";
    public static String FILE_EXTENSION = ".html";
    public static int CONNECTION_TIMEOUT = 20;
    public static int OPEN_CONNECTION_LIMIT =2;
}
```

The delta File A would be:
File name: ClientConstants.java
Delta Comment: Feature Whizzy for the client
Delta ID: A00002
1:5
: public static String FILE_PREFIX="SH";
C:6
: public static String FILE_EXTENSION=".html";
I:8
: public static int OPEN_CONNECTION_LIMIT=2;
And File B is changed:

```
package patent.demo;
public class ServerConstants {
    public static String LOG_EXTENSION =
    public static int MAX_RETRIES = 3;
    public static int RETRY_WAIT =10;
    public static int MAX_CLIENT_CONNECTIONS = 50;
}
```

The delta for file B may be:
File name: ServerConstants.java
Delta Comment: Feature Whizzy for the client
Delta ID: A00002
I:8
: public static int MAX_CLIENT_CONNECTIONS=50;

The user wants to move FILE_EXTENSION from ClientConstants.java to ServerConstants.java. The user right clicks and selects "move to file", inserting it into ServerConstants.java at line 7.

The editor reviews the deltas. This is line 6 in the current version of ClientConstants.java. In the second delta for ClientConstants.java the change is found (from xml to html for the extension). The editor notes that there is also an insert at line 5 in the file, therefore all remaining lines (including the line of interest) shift down one (working backwards in time). The editor then looks at the previous delta, which is delta1, and finds that line 5 was inserted (which is not a surprise as that is the first check in of the file).

The new delta for ClientConstants.java would be a basic delete:
File name: ClientConstants.java
Delta Comment: Refactor constants
Delta ID: A00003
D:6
And the new delta for ServerConstants.java:
File name: ServerConstants.java
Delta Comment: Refactor constants
Delta ID: A00003
Sub-delta:
Delta Comment: Initial check in of a new client
Delta ID: A00001
I:7
: public static String FILE_EXTENSION=".xml";
Sub-delta:
Delta Comment: Feature x for the client
Delta ID: A00002
C:7
: public static String FILE_EXTENSION=".html";

It should be noted that the editor will update the line numbers to reflect where in the target file (ServerConstants) the changes are made.

The current way of generating the delta would just give an insert and not a change and the fact that the file extension used to be xml and now html is lost:
File name: ServerConstants.java
Delta Comment: Refactor constants
Delta ID: A00003
I:7
: public static String FILE_EXTENSION=".html";
The final part is for the editor to tie up changes.

So, if an editor compares ServerConstants.java delta1 ("Initial check in of a new client") with delta2 ("Feature Whizzy for the client") it would show:

| | |
|---|---|
| package patent.demo; | > package patent.demo; |
| | > |
| public class ServerConstants { | > public class ServerConstants { |
| | > |
| public static String LOG_EXTENSION = ".log"; | > public static String LOG EXTENSION = ".log"; |
| public static int MAX_RETRIES = 3; | > public static int MAX_RETRIES = 3; |
| public static int RETRY_WAIT = 10; | > public static int RETRY_WAIT = 10; |
| | I public static int MAX_CLIENT_CONNECTIONS = 50; |
| } | > } |

The same compare may be shown with the described implementation, as it would not take into account all of the deltas. However, the option of a "compare including delta history" would allow the editor to match up the UUIDs for delta1 and delta2 and produce the following view:

```
package patent.demo;                          > package patent.demo;
                          >
public class ServerConstants {                >public class ServerConstants {
                          >
  public static String LOG_EXTENSION = ".log";   >   public static String
LOG_EXTENSION = ".log";
  public static int MAX_RETRIES = 3;          >   public static int MAX_RETRIES = 3;
  public static String FILE_EXTENSION = ".xml"    C public static String_FILE_EXTENSION
= ".html"
  public static int RETRY_WAIT =10;           >   public static int RETRY_WAIT = 10;
                  I public static int MAX_CLIENT_CONNECTIONS = 50;
}                         > }
```

The editor not only shows the change, but also highlights the line to show that the change was made in another file at the time (but the line is now in this file). It allows the developer to see that the rename of the file extension was done at the same time as max client connections was added.

Figure 5:
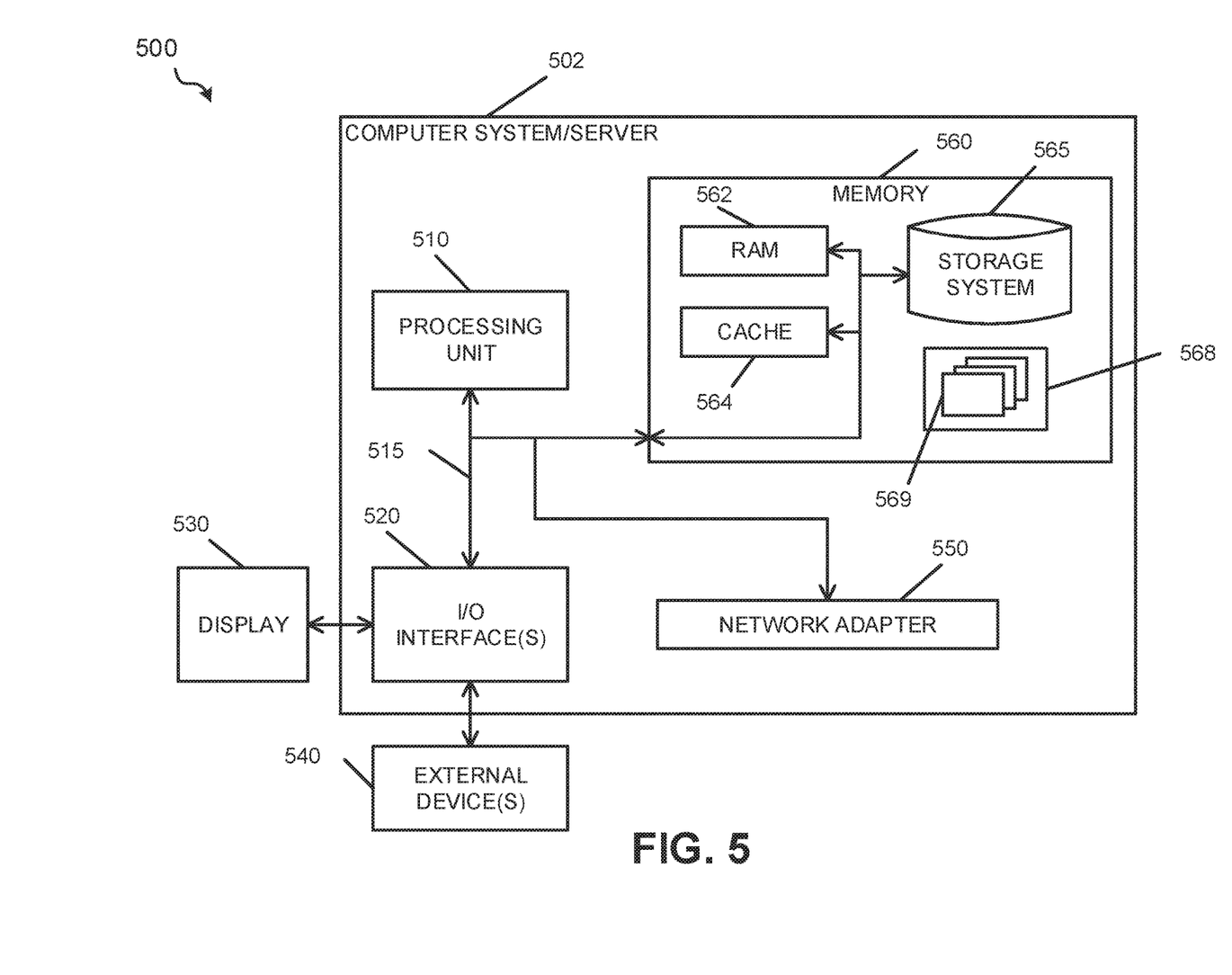
FIG. 5 depicts a block diagram of a sample computer system, according to some embodiments.

Referring to FIG. 5, computer system 500 is a computer system/server 502 is shown in the form of a general-purpose computing device, according to some embodiments. Computer system 500 may be a computing device of the client system 230 (FIG. 2), in accordance with an embodiment of the present invention. The components of computer system/server 502 may include, but are not limited to, one or more processors or processing units 510, a system memory 560, and a bus 515 that couples various system components including system memory 560 to processor 510.

Bus 515 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 560 can include computer system readable media in the form of volatile memory, such as random-access memory (RAM) 562 and/or cache memory 564. Computer system/server 502 may further include other removable/non-removable, volatile/non-volatile computer system storage media. By way of example only, storage system 565 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 515 by one or more data media interfaces. As will be further depicted and described below, memory 560 may include at least one program product having a set (e.g., at least one) of program modules that are configured to carry out the functions of embodiments of the disclosure.

Program/utility 568, having a set (at least one) of program modules 569, may be stored in memory 560 by way of example, and not limitation, as well as an operating system, one or more application programs, other program modules, and program data. Each of the operating system, one or more application programs, other program modules, and program data or some combination thereof, may include an implementation of a networking environment. Program modules 569 generally carry out the functions and/or methodologies of embodiments of the invention as described herein.

Computer system/server 502 may also communicate with one or more external devices 540 such as a keyboard, a pointing device, a display 530, etc.; one or more devices that enable a user to interact with computer system/server 502; and/or any devices (e.g., network card, modem, etc.) that enable computer system/server 502 to communicate with one or more other computing devices. Such communication can occur via Input/Output (I/O) interfaces 520. Still yet, computer system/server 502 can communicate with one or more networks such as a local area network (LAN), a general wide area network (WAN), and/or a public network (e.g., the Internet) via network adapter 550. As depicted, network adapter 550 communicates with the other components of computer system/server 502 via bus 515. It should be understood that although not shown, other hardware and/or software components could be used in conjunction with computer system/server 502. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
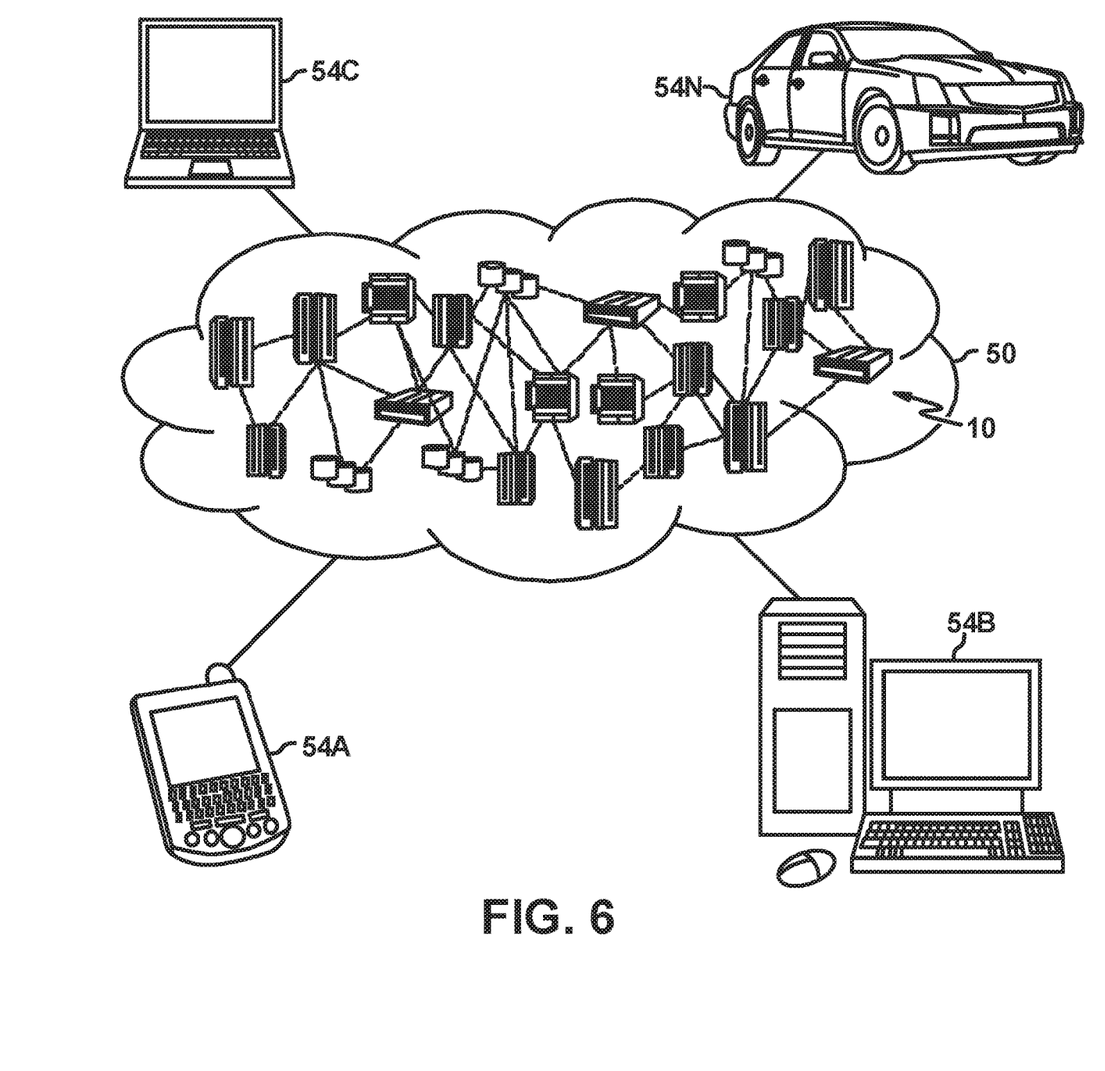
FIG. 6 depicts a cloud computing environment, according to some embodiments.

Referring now to FIG. 6, illustrative cloud computing environment 50 is depicted, according to some embodiments. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
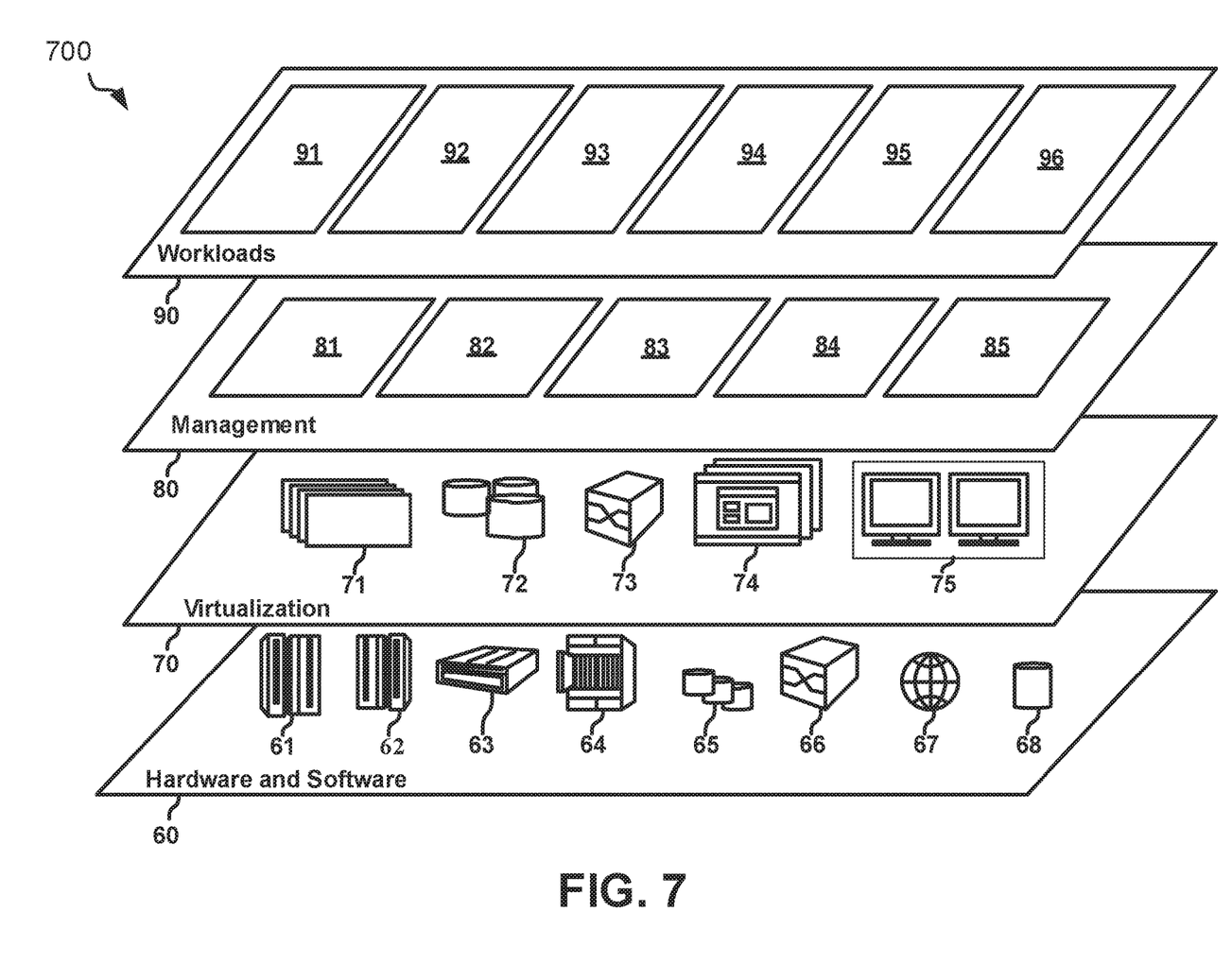
FIG. 7 depicts abstraction model layers, according to some embodiments.

Referring now to FIG. 7, a set of functional abstraction layers 700 provided by cloud computing environment 50 (FIG. 6) is shown, according to some embodiments. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and file history metadata managing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
accessing a first file with delta information;
determining a portion of the first file to be moved;
reviewing the delta information of the first file for changes to the portion in the delta information;
in response to reviewing the delta information, generating a portion delta history for the portion, wherein the portion delta history includes management history and previous delta information that is relevant to the portion of the first file to be moved;
inserting the portion of the first file with the portion delta history in a position in a second file, wherein the portion delta history of the portion is accessible for the second file; and
generating new delta information for the second file, wherein the new delta information includes the portion delta history of the inserted portion.

2. The method of claim 1, wherein accessing the first file includes constructing the first file using the delta information.

3. The method of claim 2, wherein constructing the first file includes:
identifying a first delta, the first delta containing an original first file as initially stored;
identifying one or more subsequent deltas, wherein the one or more subsequent deltas indicate changes made to the original first file; and
applying each of the one or more subsequent deltas on top of a corresponding previous delta until a current version of the first file is formed.

4. The method of claim 1, further comprising:
receiving the delta information for the first file from a source control management system; and
transmitting the new delta information for the second file to the source control management system for storage.

5. The method of claim 4, wherein the delta information for the first file includes an original version of the first file and one or more deltas showing chronological changes to the original version of the first file.

6. The method of claim 1, wherein determining the portion of the first file to be moved includes determining that the portion of the first file is to be cut from the first file.

7. The method of claim 6, further comprising:
inserting metadata at a position in the first file that the portion was cut to indicate the position in the second file that the portion is inserted.

8. The method of claim 1, wherein the first file and the second file are the same file.

9. The method of claim 1, wherein the first file and the second file are different files.

10. The method of claim 9, further comprising inserting a reference portion in a delta information of the second file to provide a reference in the delta information of the second file to the inserted portion.

11. The method of claim 1, wherein:
the portion of the first file is a logical unit of the first file that can be moved within the first file or to a second file; and
the portion delta history includes references to areas of previous delta information of the first file that are relevant to the portion.

12. A system having one or more computer processors, the system configured to:
access a first file with delta information;
determine a portion of the first file to be moved;
review the delta information of the first file for changes to the portion in the delta information;
in response to reviewing the delta information, generate a portion delta history for the portion, wherein the portion delta history includes management history and previous delta information that is relevant to the portion of the first file to be moved;
insert the portion of the first file with the portion delta history in a position in a second file, wherein the portion delta history of the portion is accessible for the second file; and
generate new delta information for the second file, wherein the new delta information includes the portion delta history of the inserted portion.

13. The system of claim 12, wherein accessing the first file includes constructing the first file using the delta information.

14. The system of claim 13, wherein constructing the first file includes:
identifying a first delta, the first delta containing an original first file as initially stored;
identifying one or more subsequent deltas, wherein the one or more subsequent deltas indicate changes made to the original first file; and
applying each of the one or more subsequent deltas on top of a corresponding previous delta until a current version of the first file is formed.

15. The system of claim 12, wherein determining the portion of the first file to be moved includes determining that the portion of the first file is to be cut from the first file.

16. The system of claim 15, further comprising:
inserting metadata at a position in the first file that the portion was cut to indicate the position in the second file that the portion is inserted.

17. A computer program product comprising a computer readable storage medium having program instructions embodied therewith, the program instructions executable by a server to cause the server to perform a method, the method comprising:
accessing a first file with delta information;
determining a portion of the first file to be moved;
reviewing the delta information of the first file for changes to the portion in the delta information;
in response to reviewing the delta information, generating a portion delta history for the portion, wherein the portion delta history includes management history and previous delta information that is relevant to the portion of the first file to be moved;

inserting the portion of the first file with the portion delta history in a position in a second file, wherein the portion delta history of the portion is accessible for the second file; and generating new delta information for the second file, wherein the new delta information includes the portion delta history of the inserted portion.

18. The computer program product of claim 17, wherein accessing the first file includes constructing the first file using the delta information.

19. The computer program product of claim 18, wherein constructing the first file includes:

identifying a first delta, the first delta containing an original first file as initially stored;

identifying one or more subsequent deltas, wherein the one or more subsequent deltas indicate changes made to the original first file; and applying each of the one or more subsequent deltas on top of a corresponding previous delta until a current version of the first file is formed.

20. The computer program product of claim 17, further comprising:

receiving the delta information for the first file from a source control management system; and transmitting the new delta information for the second file to the source control management system for storage.

* * * * *